Oct. 13, 1931.   H. PERROT   1,827,105
BRAKE MECHANISM
Original Filed Jan. 29, 1924
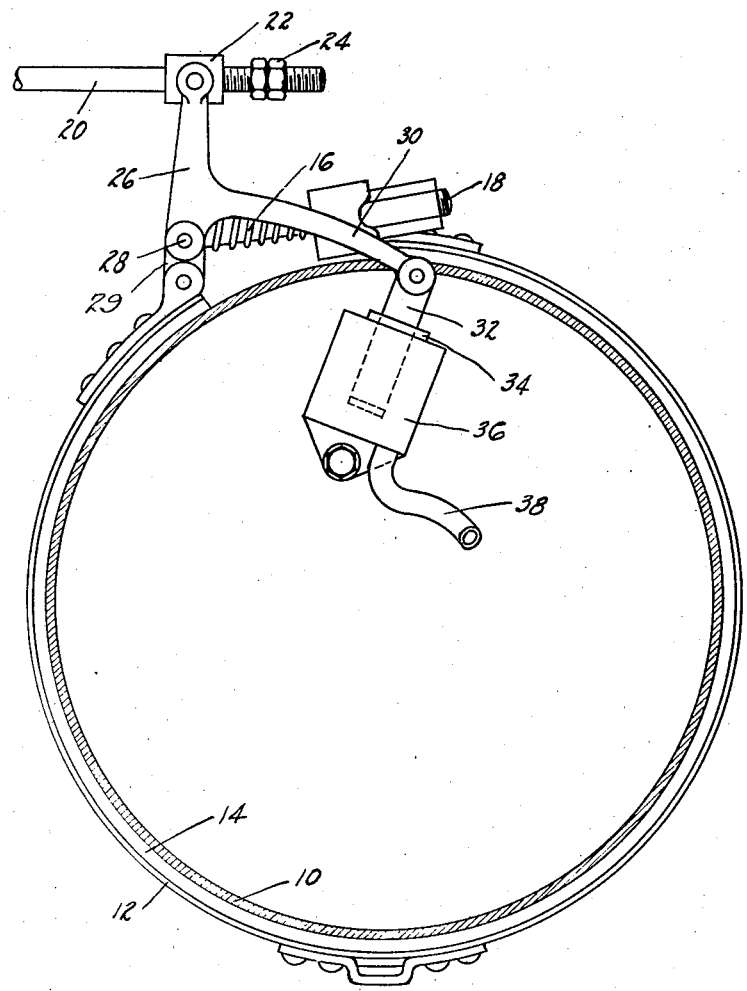
INVENTOR
HENRI PERROT
BY
Burton & McConkey,
ATTORNEYS Patented Oct. 13, 1931

1,827,105

UNITED STATES PATENT OFFICE

HENRI PERROT, OF PARIS, FRANCE, ASSIGNOR, BY MESNE ASSIGNMENTS, TO BENDIX AVIATION CORPORATION, OF NEW YORK, N. Y., A CORPORATION OF DELAWARE

BRAKE MECHANISM

Original application filed January 29, 1924, Serial No. 689,218. Divided and this application filed November 5, 1927. Serial No. 231,313.

This invention relates to improved brake mechanism intended primarily for use on motor driven vehicles.

An object is to provide simple, inexpensive, easily operable brake mechanism having a pair of applying devices, each connected with the brake and independently or jointly operable to apply the brake.

I have illustrated my invention as embodied in such a structure wherein one applying device is made up entirely of mechanical linkage connected with the brake and the other applying device includes fluid operated mechanism to apply the brake but each applying device is operable to apply the brake without influencing the other device.

Other objects, advantages and meritorious features of my invention will more fully appear from the following description, appended claims and accompanying drawing, wherein:

The figure of the drawing is a vertical sectional view through a brake drum provided with brake mechanism embodying my invention.

This application is a division of my application, Serial No. 689,218, filed January 29, 1924, and the structure illustrated comprises a brake drum 10 provided with friction means in the form of an encircling band 12 which is shown as having a lining 14. The free separable ends of the band are normally held apart by a spring 16 which encircles a bolt 18.

The first applying device, which is entirely mechanical, includes a pull rod 20 having an overrunning connection with the part 22, adjusting nuts 24 being provided, which part 22 is attached to a lever 26, which is a lever of three arms. The upwardly extending arm is connected to the part 22 as shown. A downwardly extending arm 29 is pivoted to one end of the band. The bolt 18 is pivotally secured at 28 to the intermediate portion of the lever. The spring 16 which extends between the lever at one end and the fitting on the opposite end of the band at the other end holds the band away from the drum.

The lever is provided with a third arm 30 which extends inwardly toward the drum and a plunger 32 is pivotally articulated with its free end. Plunger 32 has a free fit within a piston 34 mounted within a cylinder 36 which is supplied with fluid under pressure through a conduit 38 so that the operation of the piston likewise serves to apply the brake.

It will be seen that the brake may be applied through either applying device independently of the other and both applying devices may be employed at once if desired.

What I claim is:

1. A brake having a drum, friction means engageable therewith to retard its rotation, a pivotally supported member connected directly with the friction means to apply the same to the drum, two applying devices each having an overrunning connection with said member to actuate said member to apply the friction means to the drum independently of the other applying device and without actuation of such other applying device.

2. A brake having a drum, friction means engageable about the periphery thereof, a pivotally supported lever connected directly with the friction means to apply the same to the drum, said lever having two arms, two applying devices, one applying device having an overrunning connection with one of the arms of the lever and the other applying device having an overrunning connection with the other arm of the lever whereby the lever may be actuated by either applying device independently of the other to apply the friction means to the drum.

3. A brake having a drum, friction means engageable thereabout, a pivotally supported lever connected directly with the friction means to draw the same about the drum, said lever having a pair of relatively angularly arranged arms, two applying devices, one applying device provided with a pull rod having an overrunning connection with one arm of the lever and the other applying device provided with a hydraulically operated piston having an overrunning connection with the other arm of the lever whereby the lever may be actuated by either applying device independently of the other and in the same manner to draw the friction means about the drum.

4. A brake having a rotatable drum, a friction member associated therewith, two applying devices, a pivotally supported three-armed lever having an arm connected directly with one end of the friction member, and a pair of arms one connected with each applying device whereby the lever may be actuated by either applying device independently of the other but in the same direction to engage the friction member with the drum.

5. A brake having a drum, a brake band thereabout, a pivotally supported lever connected at one end directly with one end of the band, said lever having a pair of relatively angularly arranged arms, two applying devices, one applying device having an overrunning connection with one arm of the lever and the other applying device having a fluid operated member provided with a loose connection with the other of said arms whereby the lever may be actuated by either applying device independently of the other but in the same direction to cause the brake band to engage the drum.

6. Brake mechanism comprising, in combination, a brake drum, brake friction means movable into braking engagement with the drum, a pivotally supported T-shaped lever having one end coupled with the brake friction means to urge the same into engagement with the drum, two independently operable applying devices, one applying device coupled directly with one end of said lever to actuate the lever, and the other applying device coupled with yet another end of said lever to actuate the lever, each applying device coupled with the lever through an overrunning connection permitting independent actuation of the lever by the other applying device.

7. Brake mechanism comprising, in combination, a brake drum, brake friction means operable into engagement with the drum, a pivotally supported T-shaped lever coupled at one end with the brake friction means to urge the same into engagement with the drum and having one arm extending outwardly away from the drum and another arm extending inwardly of the drum, an applying device coupled with each arm by an overrunning joint whereby the lever may be actuated by each applying device independently of the other.

8. Brake mechanism comprising, in combination, a brake drum, brake friction means operable into braking engagement with the drum, a pivotally supported T-shaped lever having one end pivotally connected with the brake friction means to urge it against the drum and having another end connected directly with a tension member operating to actuate said lever, and having a third end connected directly with the piston of a fluid pressure actuator to be actuated thereby.

In testimony whereof, I have hereunto signed my name.

HENRI PERROT.